(12) United States Patent
Lv

(10) Patent No.: US 11,635,939 B2
(45) Date of Patent: Apr. 25, 2023

(54) PROMPTING METHOD AND MOBILE TERMINAL

(71) Applicant: VIVO MOBILE COMMUNICATION CO., LTD., Dongguan (CN)

(72) Inventor: Fang Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 83 days.

(21) Appl. No.: 17/111,489

(22) Filed: Dec. 3, 2020

(65) Prior Publication Data

US 2021/0089270 A1   Mar. 25, 2021

Related U.S. Application Data

(63) Continuation of application No. PCT/CN2019/088945, filed on May 29, 2019.

(30) Foreign Application Priority Data

Jun. 6, 2018 (CN) .......................... 201810573013.6

(51) Int. Cl.
*G06F 3/16* (2006.01)
*H04M 1/72403* (2021.01)
(Continued)

(52) U.S. Cl.
CPC ............ *G06F 3/167* (2013.01); *G06F 3/0484* (2013.01); *H04M 1/72403* (2021.01); *H04W 88/02* (2013.01)

(58) Field of Classification Search
CPC ........ G06F 3/167; G06F 3/0484; G06F 3/165; H04M 1/72403; H04M 1/0266; H04W 88/02
See application file for complete search history.

(56) References Cited

U.S. PATENT DOCUMENTS 6,081,266 A * 6/2000 Sciammarella ......... G06F 3/165
715/798
9,216,352 B2 * 12/2015 Bae ......................... G06T 15/10
(Continued)

FOREIGN PATENT DOCUMENTS

CN    1791132 A    6/2006
CN    1805457 A    7/2006
(Continued)

OTHER PUBLICATIONS

International Search Report issued in corresponding International Application No. PCT/CN2019/088945, dated Aug. 29, 2019, 4 pages.
(Continued)

*Primary Examiner* — Hien L Duong
(74) *Attorney, Agent, or Firm* — IPX PLLC

(57) ABSTRACT

This disclosure provides a prompting method and a mobile terminal. The mobile terminal includes a display screen and an exciter, where the exciter is configured to drive the display screen to give off a sound. The method includes: determining a target area, where the target area is an area on the display screen that has a sounding parameter meeting a preset condition when the display screen is driven by the exciter. The method further includes displaying prompt information in the target area, where the prompt information is used to prompt a user that an area in which the prompt information is displayed is the area that has a sounding parameter meeting a preset condition.

15 Claims, 6 Drawing Sheets

(51) Int. Cl.
*G06F 3/0484* (2022.01)
*H04W 88/02* (2009.01)

(56) References Cited

U.S. PATENT DOCUMENTS

| | | | | |
|---|---|---|---|---|
| 2007/0057909 | A1* | 3/2007 | Schobben | H04R 1/028 345/156 |
| 2013/0038603 | A1* | 2/2013 | Bae | A63F 13/285 345/204 |
| 2013/0222208 | A1* | 8/2013 | Gorilovsky | G06F 1/1647 345/1.1 |
| 2014/0080546 | A1* | 3/2014 | Gorilovsky | H04W 84/12 455/566 |
| 2014/0129681 | A1* | 5/2014 | Gorilovsky | G06F 9/4415 709/219 |
| 2014/0310643 | A1* | 10/2014 | Karmanenko | G06F 1/1626 455/566 |
| 2015/0268830 | A1* | 9/2015 | Martynov | G06F 3/04842 715/766 |
| 2015/0301789 | A1* | 10/2015 | Youn | G06F 3/0412 345/173 |
| 2016/0116982 | A1* | 4/2016 | Baek | G06F 3/016 345/156 |
| 2016/0147262 | A1* | 5/2016 | Lee | G06F 1/1675 345/173 |
| 2020/0077169 | A1* | 3/2020 | Noh | H04M 1/03 |
| 2020/0204135 | A1* | 6/2020 | Qin | H03G 5/165 |
| 2021/0297760 | A1* | 9/2021 | Noh | H04R 1/028 |

FOREIGN PATENT DOCUMENTS

| | | |
|---|---|---|
| CN | 102413282 A | 4/2012 |
| CN | 103139338 A | 6/2013 |
| CN | 104063111 A | 9/2014 |
| CN | 105100610 A | 11/2015 |
| CN | 106095280 A | 11/2016 |
| CN | 106686493 A | 5/2017 |
| CN | 108874357 A | 11/2018 |

OTHER PUBLICATIONS

First Office Action issued in related Chinese Application No. 201810573013.6, dated Nov. 25, 2019, 9 pages.
Second Office Action issued in related Chinese Application No. 201810573013.6, dated Apr. 28, 2020, 7 pages.
Third Office Action issued in related Chinese Application No. 201810573013.6, dated Aug. 31, 2020, 5 pages.
Fourth Office Action issued in related Chinese Application No. 201810573013.6, dated May 19, 2021, 7 pages.

* cited by examiner

PROMPTING METHOD AND MOBILE TERMINAL

CROSS-REFERENCE TO RELATED APPLICATIONS

This application is a continuation of PCT Application No. PCT/CN2019/088945 filed May 29, 2019, which claims priority to Chinese Patent Application No. 201810573013.6 filed in China on Jun. 6, 2018, both of which are incorporated herein by reference in their entireties.

TECHNICAL FIELD

This disclosure relates to the field of communications technologies, and in particular, to a prompting method and a mobile terminal.

BACKGROUND

As full-screen mobile terminal technologies and micro-slit mobile terminal technologies become mature, a phone receiver of a mobile terminal is configured increasingly concealed. The conventional phone receivers in some mobile terminals are even eliminated by using screen sounding, to provide the mobile terminals with a full-screen design.

At present, screen sounding is generally provided by driving an exciter through an audio decoding circuit, and generating a sound wave by vibration of a display screen as a medium, to provide loudspeaking in replacement of a conventional phone receiver. However, it is difficult for a user to determine an area on the display screen with the best sounding effect during use, which results in poor listening experience of the user as the user listens at a position with poor sounding effect.

SUMMARY

Embodiments of this disclosure provide a prompting method and a mobile terminal to solve a problem in the related art that a user has poor listening experience in using a mobile terminal with screen sounding because the user is uncertain of a sounding position and a listening position of the screen.

To resolve the foregoing technical problem, this disclosure is implemented as follows.

According to a first aspect, an embodiment of this disclosure provides a prompting method, applied to a mobile terminal, where the mobile terminal includes a display screen and an exciter, and the exciter is configured to drive the display screen to give off a sound. The method includes:

determining a target area, where the target area is an area on the display screen that has a sounding parameter meeting a preset condition when the display screen is driven by the exciter; and displaying prompt information in the target area, where the prompt information is used to prompt a user that an area in which the prompt information is displayed is the area that has a sounding parameter meeting a preset condition.

According to a second aspect, an embodiment of this disclosure further provides a mobile terminal, including a display screen and an exciter, where the exciter is configured to drive the display screen to give off a sound. The mobile terminal further includes:

a determining module configured to determine a target area, where the target area is an area on the display screen that has a sounding parameter meeting a preset condition when the display screen is driven by the exciter; and a displaying module configured to display prompt information in the target area, where the prompt information is used to prompt a user that an area in which the prompt information is displayed is the area that has a sounding parameter meeting a preset condition.

According to a third aspect, an embodiment of this disclosure further provides a mobile terminal, including a processor, a memory, and a computer program that is stored in the memory and capable of running on the processor, where when the computer program is executed by the processor, the steps of the foregoing prompting method are implemented.

According to a fourth aspect, an embodiment of this disclosure further provides a computer-readable storage medium, where the computer-readable storage medium stores a computer program, and when the computer program is executed by a processor, the steps of the foregoing prompting method are implemented.

In the embodiments of this disclosure, the target area is determined, where the target area is the area on the display screen that has a sounding parameter meeting a preset condition when the display screen is driven by the exciter. The prompt information is displayed in the target area, where the prompt information is used to prompt a user that the area in which the prompt information is displayed is the area that has a sounding parameter meeting a preset condition. In this way, by displaying the prompt information used to prompt the user, experience of the user in listening to the sound given off by the display screen can be improved.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

The following dearly and describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
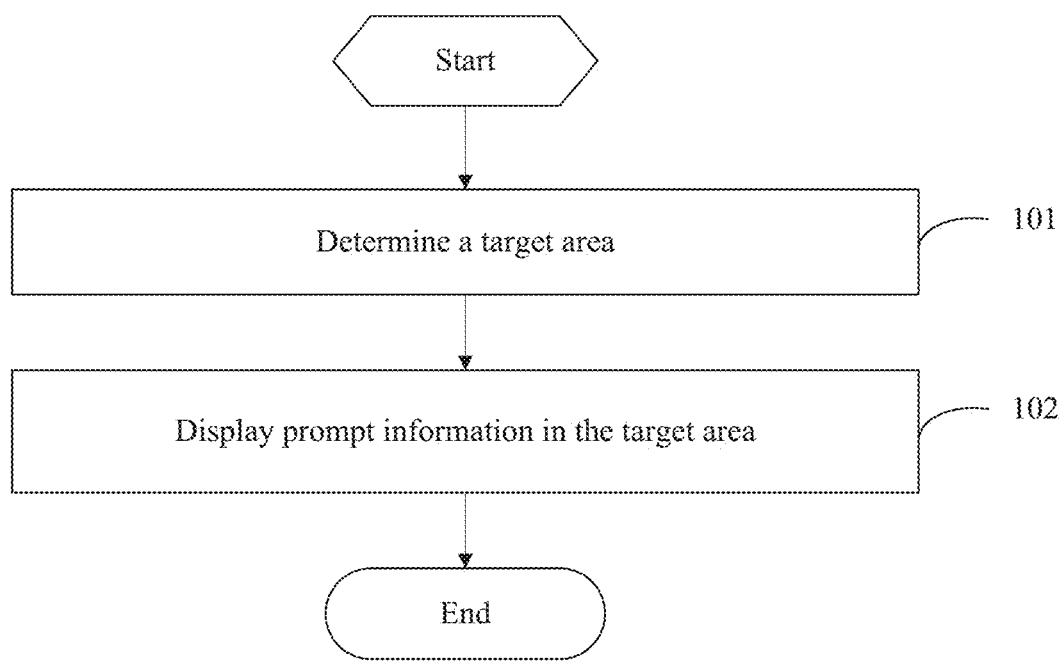
FIG. 1 is a flowchart of a prompting method according to an embodiment of this disclosure.

FIG. 1 is a flowchart of a prompting method according to an embodiment of this disclosure. The prompting method according to this embodiment of this disclosure is applied to a mobile terminal including a display screen and an exciter, where the exciter is configured to drive the display screen to give off a sound. The prompting method replaces a conventional phone receiver component by using screen sounding. In this way, there is no need to reserve an area on a side of the display screen of the mobile terminal for installing the phone receiver component, thereby increasing a screen-to-body ratio of the mobile terminal and adapting to the development trend of full-screen mobile terminals. For example, screen sounding may be provided by driving the exciter through an audio decoding circuit, and generating a sound wave by vibration of the display screen as a medium, to provide loudspeaking in replacement of a conventional phone receiver.

As shown in FIG. 1, the prompting method according to the embodiment of this disclosure includes the following steps:

Step 101. Determine a target area.

In this step, the target area is an area on the display screen that has a sounding parameter meeting a preset condition when the display screen is driven by the exciter. The sounding parameter meeting a preset condition may mean that a volume in this area is greater than a preset volume, such that a user may clearly hear the sound given off by the screen. It may also refer to an area with the highest volume or the optimal sounding effect on the screen, as long as a listening demand of the user is met.

The user may set the sounding parameter to meet a demand of the user.

In addition, as an installation relationship between the exciter and the display screen is fixed, parameters of the sound given off by the screen are also fixed, except that the volume of the sound is different in different areas. In a specific application, a specific position of the exciter on the display screen may be determined according to a performance parameter of the mobile terminal, and then a sounding parameter of each area on the display screen may be determined according to a sounding principle of the exciter and a sound transmission principle. As such, the area that has a parameter meeting a preset condition may be determined as the target area based on the sounding parameter of each area.

Step 102. Display prompt information on the target area.

In this step, the prompt information may be displayed in the target area when the exciter drives the display screen to give off the sound, that is, when screen sounding is needed. For example, when the terminal receives an incoming call, prompt information may be displayed in the target area of the terminal during ringing, or the prompt information may be displayed in the target area when a call mode is entered. Further, by displaying the prompt information in the target area to prompt the user that the area in which the prompt information is displayed is the area that has a sound parameter meeting a preset condition, the user may place the area in which the prompt information is displayed near an ear of the user, thereby improving experience of the user in listening to the sound given off by the display screen.

The prompt information includes at least one of icon information or text information. The icon information may be an ear icon, a sound icon, a phone receiver icon, and the like. The icon information may be a built-in icon of the mobile terminal or a new icon updated and added by the user, as long as it allows the user to clearly know that the area in which the prompt information is displayed is the area that has a sounding parameter meeting a preset condition. The text information may be a message similar to "sounding in this area is the best", where content of the text information may be set by the user, or may be a message in factory defaults of the mobile terminal. In addition, the prompt information may alternatively be a combination of icon information and text information, such as a combination of an ear icon and text information, as shown in FIG. 2e.

Figure 2A:
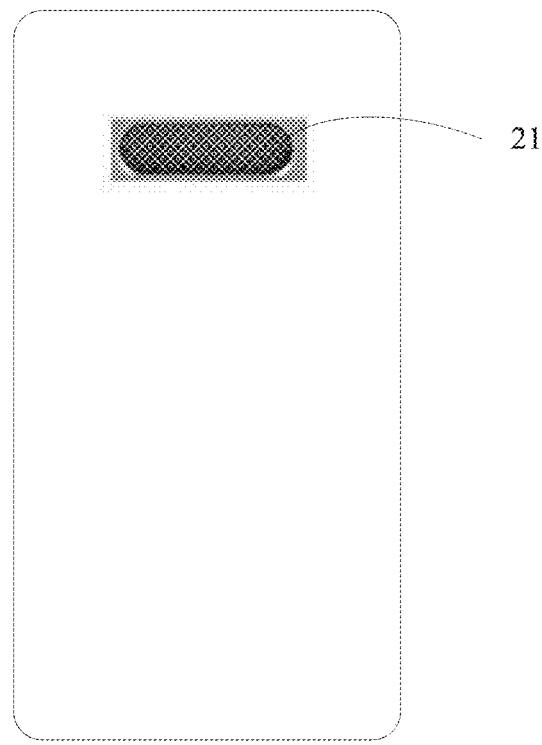
FIG. 2a is a first schematic diagram of display of prompt information according to this disclosure.
Figure 2B:
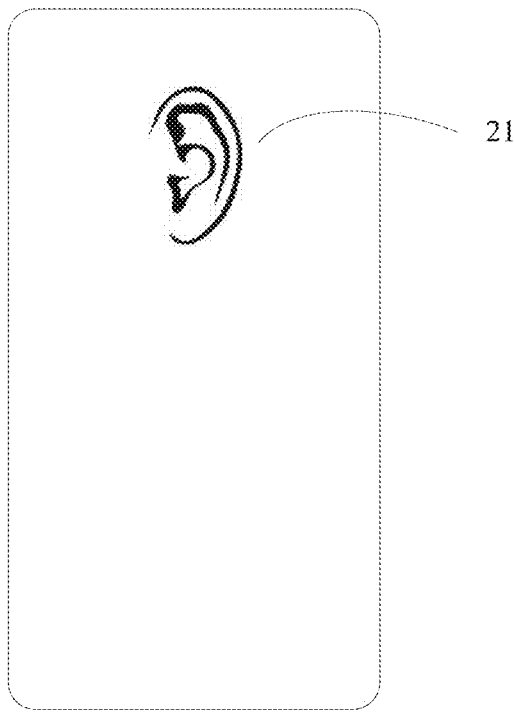
FIG. 2b is a second schematic diagram of display of prompt information according to this disclosure.
Figure 2C:
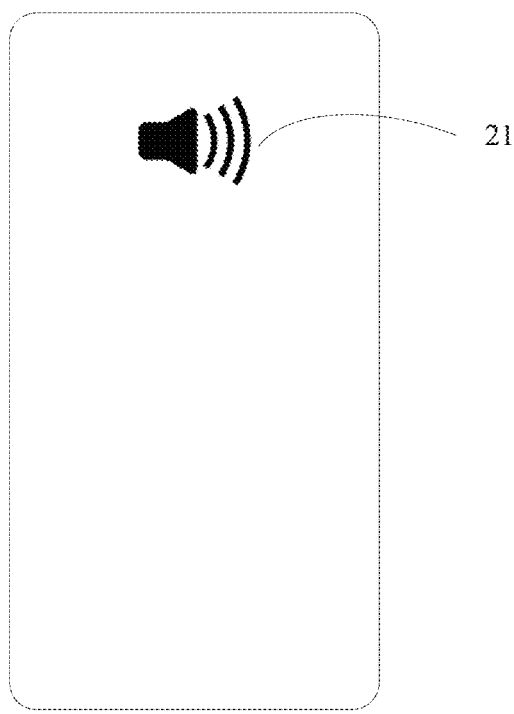
FIG. 2c is a third schematic diagram of display of prompt information according to this disclosure.
Figure 2D:
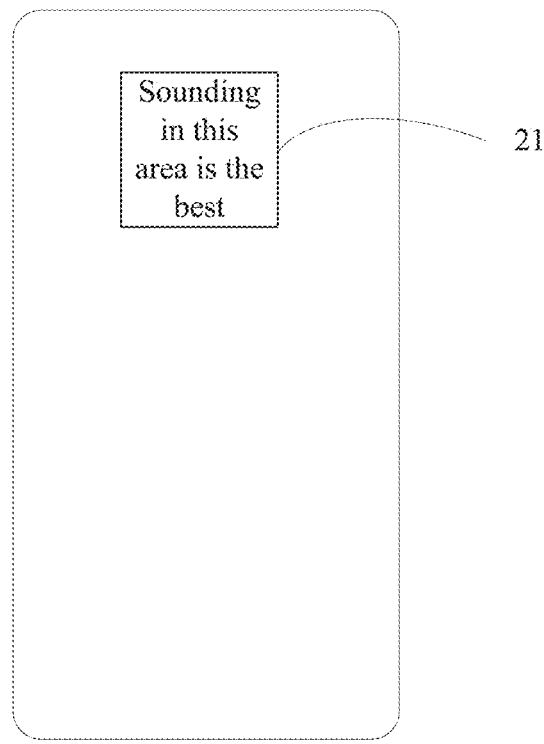
FIG. 2d is a fourth schematic diagram of display of prompt information according to this disclosure.
Figure 2E:
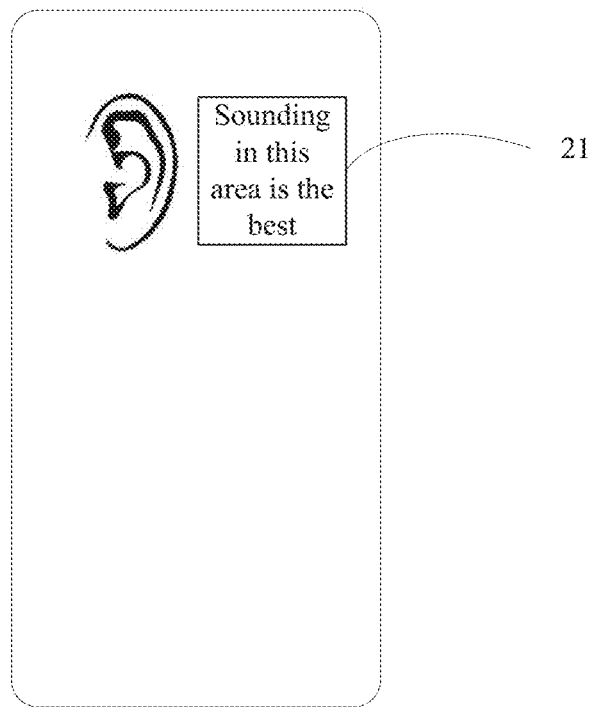
FIG. 2e is a fifth schematic diagram of display of prompt information according to this disclosure.

Schematic diagrams of the display of the prompt information are shown in FIG. 2a to FIG. 2e. FIG. 2a is a schematic diagram of the display where the prompt information 21 is a phone receiver icon. FIG. 2b is a schematic diagram of the display where the prompt information 21 is an ear icon. FIG. 2c is a schematic diagram of the display where the prompt information 21 is a sound icon. FIG. 2d is a schematic diagram of the display where the prompt information 21 is text information. FIG. 2e is a schematic diagram of the display where the prompt information 21 is a combination of text information and an ear icon.

Optionally, the method further includes, after displaying the prompt information in the target area: detecting a positional relationship of the target area relative to a target object; and if the positional relationship being a preset positional relationship is detected, controlling the mobile terminal to output a reminder message; where the preset positional relationship includes at least one of an alignment setting of the target area with the target object, or a relative distance between the target area and the target object being less than a preset distance.

In this implementation, when the display screen is used to give off the sound, the positional relationship of the target area relative to the target object may be detected by a sensor such as a distance sensor or a motion sensor, and the mobile terminal may be controlled to output the reminder message when the positional relationship is the preset positional relationship, to remind the user that with the current positional relationship, the best listening effect may be obtained for an ear of the user. In this way, the user may keep a current posture to listen to the sound given off by the display screen according to the reminder message, which further improves the listening effect. The reminder message may be speech information or vibration information. For example, if the positional relationship being the preset positional relationship is detected, the mobile terminal may be controlled to vibrate.

The target object may be an ear of the user, or another body part set by the user, such as the face or a cheek.

The preset positional relationship includes at least one of the following items, or may be a preset positional relationship formed by a combination of the following two items: the alignment setting of the target area with the target object, and the distance between the target area and the target object being less than the preset distance.

Alternatively, the positional relationship between the target object and the target area may be determined by means of touchscreen detection. For example, when action of the target object on the display screen is detected, the positional relationship between the target object and the target area is determined as consistent with the preset positional relationship, and the mobile terminal is controlled to output the reminder message.

It should be noted that in the process of determining the alignment relationship of the target area with the target object, a projection of the target object on the display screen may be detected. When the projection of the target object on the display screen is completely located within the target area or completely covers the target area, it is determined that the positional relationship between the target area and the target object is the alignment relationship.

Further optionally, the controlling the mobile terminal to output a reminder message includes: determining an output parameter of the reminder message based on the positional relationship; and outputting the reminder message according to the output parameter.

In this implementation, the output parameter includes a vibration frequency, a vibration duration, a speech length, a speech size, and the like. By setting a corresponding relationship between the positional relationship and the output parameter, where different output parameters are determined according to different positional relationships, and different levels of reminder messages are further output, user experience of the user may be enriched. For example, when the target area is aligned with the target object, a vibration may be output as a reminder message; and when the distance between the target area and the target object is less than the preset distance, speech information may be output. In addition, different speech information, such as ringtones, may be output according to different distances.

Specifically, for example, a smaller relative distance between the target area and the target object comes with a greater volume of the speech information or a stronger vibration, so as to achieve the purpose of reminding the user.

Optionally, the displaying prompt information in the target area includes: when screen-off processing is required for the display screen, displaying the prompt information in the target area, and providing screen-off processing for other areas on the display screen than the target area.

In this implementation, when screen-off processing is required for the display screen, the prompt information may be constantly displayed in the target area, such that the user may at any time check the position of the target area, that is, the area in which the prompt information is displayed, and other areas on the display screen than the target area may be controlled to have screen-off processing, so as to reduce display power consumption of the display screen. For example, an always-on display function of the display screen may be used to display the reminder message, or a touch control function may be turned off to maintain the display of the indication information on the display screen.

In a specific implementation of this disclosure, in the process of telephone communication, upon receiving a touch control operation by the user on an answer button, the exciter enters a working mode and drives the display screen to give off a sound, while the prompt information such as an ear icon or text information is displayed in the target area, to prompt the user that the area in which the prompt information is displayed is the area that has a sounding parameter meeting a preset condition, that is, the area that provides better listening effect. In this way, the experience of the user in listening to the screen sounding can be effectively improved.

Figure 3:
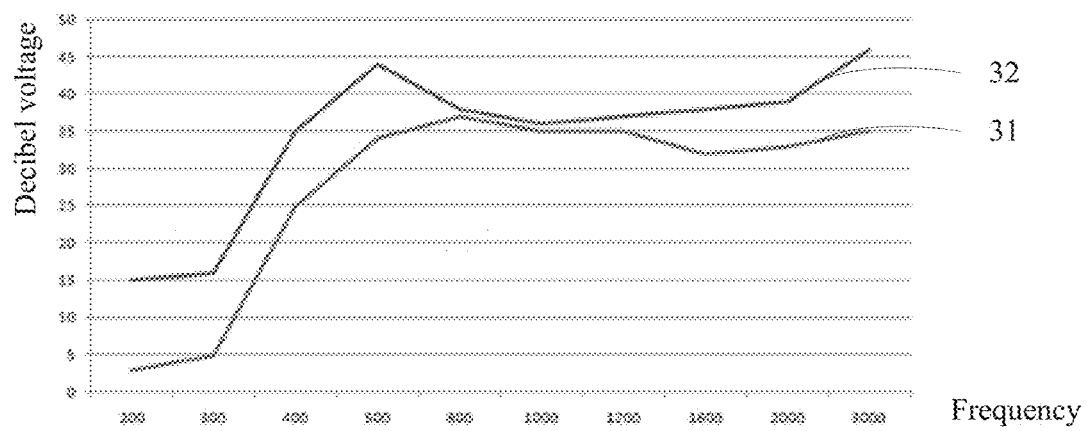
FIG. 3 is a comparison diagram of sounding effects according to this disclosure.

It should be noted that as the exciter transmits a sound by vibration, if the exciter is positioned too close to the top of the mobile terminal, a problem such as loosening of the display screen and the like may easily occur. Therefore, the exciter is generally positioned in the upper part of the mobile terminal, instead of being at the top of the mobile terminal. The sounding effect given by the exciter located in the upper part of the mobile terminal is different from that given by a conventional phone receiver component. It is found from a practical test that difference between the volume of a sound given off by using an exciter and that of a sound given off by using a conventional phone receiver is about 6 decibels. As shown in FIG. 3, a horizontal coordinate represents a sounding frequency, while a vertical coordinate represents a decibel voltage (DVB/PA). A curve 31 represents a sounding curve of a conventional phone receiver at different frequencies, and a curve 32 represents a sounding curve of an exciter at different frequencies.

Accordingly, as a sounding area of the mobile terminal with screen sounding is not at the top of the mobile terminal, a sound transmission path into a human ear is different from that of a conventional phone receiver. By displaying the prompt information on the display screen, the user may be guided to change an old use habit of the user to improve the listening effect.

In this embodiment of this disclosure, the mobile terminal may be a mobile phone, a tablet computer (TC), a wearable device (WD), or the like.

In the prompting method according to this embodiment of this disclosure, the target area is determined, where the target area is the area on the display screen that has a sounding parameter meeting a preset condition when the display screen is driven by the exciter. The prompt information is displayed in the target area, where the prompt information is used to prompt the user that the area in which the prompt information is displayed is the area that has a sounding parameter meeting a preset condition. In this way, by displaying the prompt information used to prompt the user, experience of the user in listening to the sound given off by the display screen can be improved.

Figure 4:
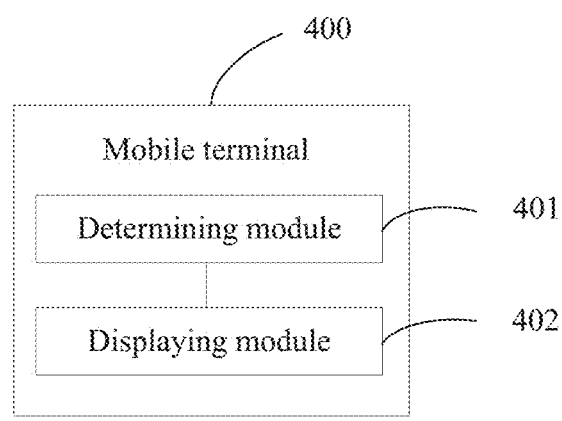
FIG. 4 is a first structural diagram of a mobile terminal according to an embodiment of this disclosure.

Referring to FIG. 4, FIG. 4 is a structural diagram of a mobile terminal according to an embodiment of this disclosure. As shown in FIG. 4, the mobile terminal 400 includes a display screen and an exciter. The exciter is configured to drive the display screen to give off a sound. The mobile terminal further includes a determining module 401 and a displaying module 402, where the determining module 401 is connected to the displaying module 402.

The determining module 401 is configured to determine a target area, where the target area is an area on the display screen that has a sounding parameter meeting a preset condition when the display screen is driven by the exciter.

The displaying module 402 is configured to display prompt information in the target area, where the prompt information is used to prompt a user that an area in which the prompt information is displayed is the area that has a sounding parameter meeting a preset condition.

Figure 5:
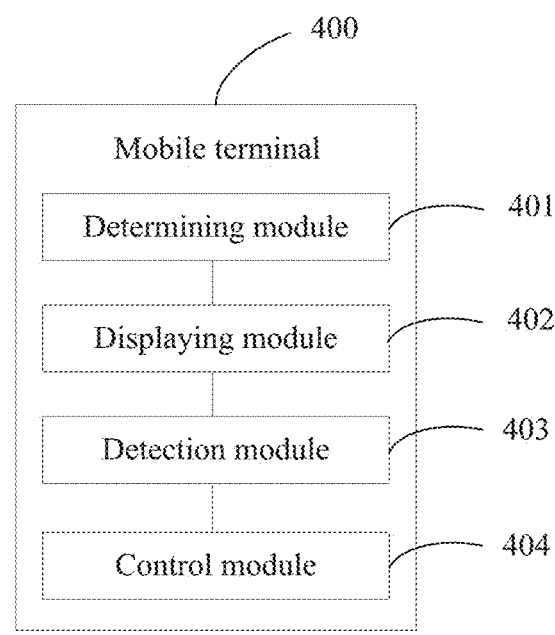
FIG. 5 is a second structural diagram of a mobile terminal according to an embodiment of this disclosure.

Optionally, as shown in FIG. 5, the mobile terminal 400 further includes:

a detection module 403 configured to detect a positional relationship of the target area relative to a target object; and a control module 404 configured to control the mobile terminal to output a reminder message if the positional relationship being a preset positional relationship is detected.

The preset positional relationship includes at least one of the following items: an alignment setting of the target area with the target object, or a relative distance between the target area and the target object being less than a preset distance.

Optionally, the control module 404 includes:

a determining sub-module configured to determine an output parameter of the reminder message based on the positional relationship; and an output sub-module configured to output the reminder message according to the output parameter.

Optionally, the displaying module 402 is specifically configured to, when screen-off processing is required for the display screen, display the prompt information in the target area, and provide screen-off processing for other areas on the display screen than the target area.

Optionally, the area that has a sounding parameter meeting a preset condition includes at least one of: an area that has a volume greater than a preset volume; or an area on the display screen that has the highest volume.

The mobile terminal 400 can implement various processes that are implemented by the mobile terminal in the method embodiments shown in FIG. 1 to FIG. 3. To avoid repetition, details are not described herein again.

In the mobile terminal 400 according to this embodiment of this disclosure, the target area is determined, where the target area is the area on the display screen that has a sounding parameter meeting a preset condition when the display screen is driven by the exciter. The prompt information is displayed in the target area, where the prompt information is used to prompt the user that the area in which the prompt information is displayed is the area that has a sounding parameter meeting a preset condition. In this way, by displaying the prompt information used to prompt the user, experience of the user in listening to the sound given off by the display screen can be improved.

Figure 6:
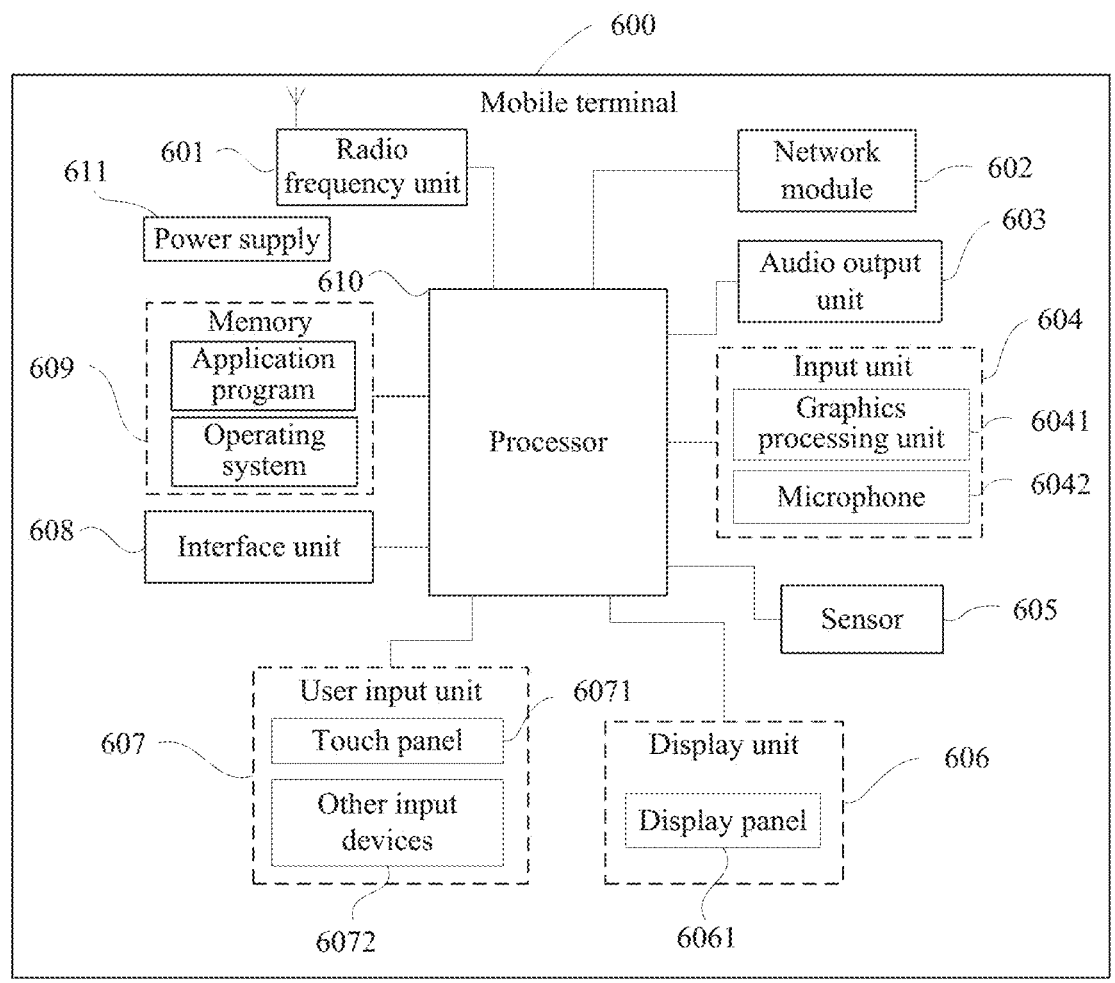
FIG. 6 is a structural diagram of a mobile terminal according to another embodiment of this disclosure.

FIG. 6 is a schematic diagram of a hardware structure of a mobile terminal implementing the embodiments of this disclosure. As shown in FIG. 6, the mobile terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the mobile terminal structure shown in FIG. 6 does not constitute a limitation on the mobile terminal. The mobile terminal may include more or fewer components than those shown in the figure, or some components may be combined, or there may be a different component layout. In an embodiment of this disclosure, the mobile terminal includes but is not limited to a mobile phone, a tablet computer, a notebook computer, a palmtop computer, an in-vehicle terminal, a wearable device, a pedometer, and the like.

The processor 610 is configured to determine a target area, where the target area is an area on the display screen that has a sounding parameter meeting a preset condition when the display screen is driven by the exciter; and display prompt information in the target area, where the prompt information is used to prompt a user that an area in which the prompt information is displayed is the area that has a sounding parameter meeting a preset condition.

Optionally, the processor 610 is further configured to: detect a positional relationship of the target area relative to a target object; and if the positional relationship being a preset positional relationship is detected, control the mobile terminal to output a reminder message; where the preset positional relationship includes at least one of: an alignment setting of the target area with the target object, or a relative distance between the target area and the target object being less than a preset distance.

Optionally, the processor 610 is further configured to: determine an output parameter of the reminder message based on the positional relationship; and output the reminder message according to the output parameter.

Optionally, the processor 610 is further configured to, when screen-off processing is required for the display screen, display the prompt information in the target area, and provide screen-off processing for other areas on the display screen than the target area.

Optionally, the area that has a sounding parameter meeting a preset condition includes at least one of: an area that has a volume greater than a preset volume; or an area on the display screen that has the highest volume.

The mobile terminal 600 can implement various processes that are implemented by the mobile terminal in the foregoing embodiments. To avoid repetition, details are not described herein again.

In the mobile terminal 600 according to this embodiment of this disclosure, the target area is determined, where the target area is the area on the display screen that has a sounding parameter meeting a preset condition when the display screen is driven by the exciter. The prompt information is displayed in the target area, where the prompt information is used to prompt the user that the area in which the prompt information is displayed is the area that has a sounding parameter meeting a preset condition. In this way, by displaying the prompt information used to prompt the user, experience of the user in listening to the sound given off by the display screen can be improved.

It should be understood that in an embodiment of this disclosure, the radio frequency unit 601 may be configured to: receive and send signals in an information receiving/sending process or a call process; and specifically, after receiving downlink data from a base station, send the downlink information to the processor 610 for processing, and in addition, send uplink data to the base station. Generally, the radio frequency unit 601 includes but is not limited to an antenna, at least one amplifier, a transceiver, a coupler, a low noise amplifier, a duplexer, or the like. In addition, the radio frequency unit 601 may further communicate with a network and another device through a wireless communications system.

The mobile terminal provides a user with wireless broadband internet access through the network module 602, for example, helping the user to send or receive an e-mail, to browse a web page, or to access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the mobile terminal 600. The audio output unit 603 includes a speaker, a buzzer, a phone receiver, and the like.

The input unit 604 is configured to receive an audio or video signal. The input unit 604 may include a graphics processing unit (GPU) 6041 (as referred to GPU 6041) and a microphone 6042, and the GPU 6041 processes image data of a still picture or a video obtained by an image capture apparatus (for example, a camera) in an image capture mode or a video capture mode. A processed image frame may be displayed on the display unit 606. An image frame processed by the GPU 6041 may be stored in the memory 609 (or another storage medium) or sent by the radio frequency unit 601 or the network module 602. The microphone 6042 can receive a sound and can process the sound into audio data.

The processed audio data can be converted into a format that can be sent to a mobile communication base station through the radio frequency unit 601 in a telephone call mode, for outputting.

The mobile terminal 600 further includes at least one sensor 605, such as a light sensor, a motion sensor, or other sensors. Specifically, the light sensor includes an ambient light sensor and a proximity sensor, where the ambient light sensor can adjust luminance of a display panel 6061 based on brightness of ambient light, and the proximity sensor can turn off the display panel 6061 and/or backlight when the mobile terminal 600 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include the display panel 6061, and the display panel 6061 may be configured in the form of a liquid crystal display (LCD), an organic light-emitting diode (OLED), or the like.

The user input unit 607 may be configured to receive input digit or character information and generate key signal input related to user setting and function control of the mobile terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. Although in FIG. 6, the touch panel 6071 and the display panel 6061 act as two independent parts to implement input and output functions of the mobile terminal, in some embodiments, the touch panel 6071 and the display panel 6061 may be integrated to implement the input and output functions of the mobile terminal. This is not specifically limited herein.

The interface unit 608 is an interface connecting an external apparatus to the mobile terminal 600. For example, the external apparatus may include a wired or wireless headphone port, an external power (or battery charger) port, a wired or wireless data port, a memory card port, a port for connecting an apparatus provided with a recognition module, an audio input/output (I/O) port a video I/O port, an earphone port, and the like. The interface unit 608 may be configured to: receive input (for example, data information and power) from the external apparatus, and transmit the received input to one or more elements in the mobile terminal 600, or may be configured to transmit data between the mobile terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), or the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the mobile terminal, and is connected to all components of the mobile terminal by using various interfaces and lines. By running or executing a software program and/or module that is stored in the memory 609 and calling data stored in the memory 609, the processor 610 executes various functions of the mobile terminal and processes data, so as to perform overall monitoring on the mobile terminal. The processor 610 may include one or more processing units. Preferably, an application processor and a modem processor may be integrated into the processor 610. The application processor mainly processes an operating system, a user interface, an application program, and the like. The modem processor mainly processes wireless communication. It may be understood that the modem processor may alternatively not be integrated into the processor 610.

The mobile terminal 6061 may further include the power supply 611 (for example, a battery) supplying power to all components. Preferably, the power supply 611 may be logically connected to the processor 610 through a power management system. In this way, functions such as charge management, discharge management, and power consumption management are implemented by using the power management system.

In addition, the mobile terminal 600 includes some functional modules that are not shown, details of which are not described herein.

Preferably, an embodiment of this disclosure further provides a mobile terminal, including: a processor 610, a memory 609, and a computer program that is stored in the memory 609 and capable of running on the processor 610. When the computer program is executed by the processor 610, processes in the foregoing embodiments of the prompting method are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing embodiments of the prompting method are implemented, with the same technical effects achieved. To avoid repetition, details are not described herein again. The computer-readable storage medium may be a read-only memory (ROM), a random access memory (RAM), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is an exemplary implementation. Based on such an understanding, the technical solutions of this disclosure essentially, or the part contributing to the related art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A prompting method, applied to a mobile terminal, wherein the mobile terminal comprises a display screen and an exciter, and the exciter is configured to drive the display screen to give off a sound, causing a plurality of areas on the display screen to have different sounding parameters; and the method comprises:
    determining a target area, wherein the target area is an area on the display screen that has a sounding parameter meeting a preset condition when the display screen is driven by the exciter; and
    displaying prompt information in the target area, wherein the prompt information indicates to a user that the target area in which the prompt information is displayed has a sounding parameter meeting the preset condition.

2. The prompting method according to claim 1, wherein after the displaying prompt information in the target area, the method further comprises:
    detecting a positional relationship of the target area relative to a target object; and
    if the positional relationship being a preset positional relationship is detected, controlling the mobile terminal to output a reminder message; wherein
    the preset positional relationship comprises at least one of the following items: an alignment setting of the target area with the target object, or a relative distance between the target area and the target object being less than a preset distance.

3. The prompting method according to claim 2, wherein the controlling the mobile terminal to output a reminder message comprises:
    determining an output parameter of the reminder message based on the positional relationship; and
    outputting the reminder message according to the output parameter.

4. The prompting method according to claim 1, wherein the displaying prompt information in the target area comprises:
    when screen-off processing is required for the display screen, displaying the prompt information in the target area, and providing screen-off processing for other areas on the display screen than the target area.

5. The prompting method according to claim 1, wherein the area that has a sounding parameter meeting a preset condition comprises at least one of an area that has a volume greater than a preset volume; or an area on the display screen that has a highest volume.

6. A mobile terminal comprising a display screen and an exciter, wherein the exciter is configured to drive the display screen to give off a sound, causing a plurality of areas on the display screen to have different sounding parameters, the mobile terminal further comprising:
    a determining module configured to determine a target area, wherein the target area is an area on the display screen that has a sounding parameter meeting a preset condition when the display screen is driven by the exciter; and
    a displaying module configured to display prompt information in the target area, wherein the prompt information indicates to a user that the target area in which the prompt information is displayed has a sounding parameter meeting the preset condition.

7. The mobile terminal according to claim 6, further comprising:
    a detection module configured to detect a positional relationship of the target area relative to a target object; and
    a control module configured to control the mobile terminal to output a reminder message if the positional relationship being a preset positional relationship is detected; wherein
    the preset positional relationship comprises at least one of the following items: an alignment setting of the target area with the target object, or a relative distance between the target area and the target object being less than a preset distance.

8. The mobile terminal according to claim 7, wherein the control module comprises:
    a determining sub-module configured to determine an output parameter of the reminder message based on the positional relationship; and
    an output sub-module configured to output the reminder message according to the output parameter.

9. The mobile terminal according to claim 6, wherein the displaying module is configured to, when the screen-off processing is required for the display screen, display the prompt information in the target area, and provide screen-off processing for other areas on the display screen than the target area.

10. The mobile terminal according to claim 6, wherein the area that has a sounding parameter meeting a preset condition comprises at least one of an area that has a volume greater than a preset volume; or an area on the display screen that has a highest volume.

11. A non-transitory computer-readable storage medium storing a computer program, wherein when the computer program is executed by a processor, perform a prompting method, the prompting method comprising:
  determining a target area, wherein the target area is an area on a display screen that has a sounding parameter meeting a preset condition when the display screen is driven by an exciter to give off a sound, wherein driving the display screen to give off the sound causes a plurality of areas on the display screen to have different sounding parameters; and
  displaying prompt information in the target area, wherein the prompt information indicates to a user that the target area in which the prompt information is displayed has a sounding parameter meeting the preset condition.

12. The non-transitory computer-readable storage medium according to claim 11, wherein after the displaying prompt information in the target area, the method further comprises:
  detecting a positional relationship of the target area relative to a target object; and
  if the positional relationship being a preset positional relationship is detected, controlling the mobile terminal to output a reminder message; wherein
  the preset positional relationship comprises at least one of the following items: an alignment setting of the target area with the target object, or a relative distance between the target area and the target object being less than a preset distance.

13. The non-transitory computer-readable storage medium according to claim 12, wherein the controlling the mobile terminal to output a reminder message comprises:
  determining an output parameter of the reminder message based on the positional relationship; and
  outputting the reminder message according to the output parameter.

14. The non-transitory computer-readable storage medium according to claim 13, wherein the displaying prompt information in the target area comprises:
  when screen-off processing is required for the display screen, displaying the prompt information in the target area, and providing screen-off processing for other areas on the display screen than the target area.

15. The non-transitory computer-readable storage medium according to claim 11, wherein the area that has a sounding parameter meeting a preset condition comprises at least one of an area that has a volume greater than a preset volume; or an area on the display screen that has a highest volume.

* * * * *